C. MERLI AND G. BERTOLINI.
MACHINE FOR STUFFING MEAT AND LIKE PROVISIONS.
APPLICATION FILED SEPT. 4, 1920.
1,395,967.
Patented Nov. 1, 1921.
3 SHEETS—SHEET 3.
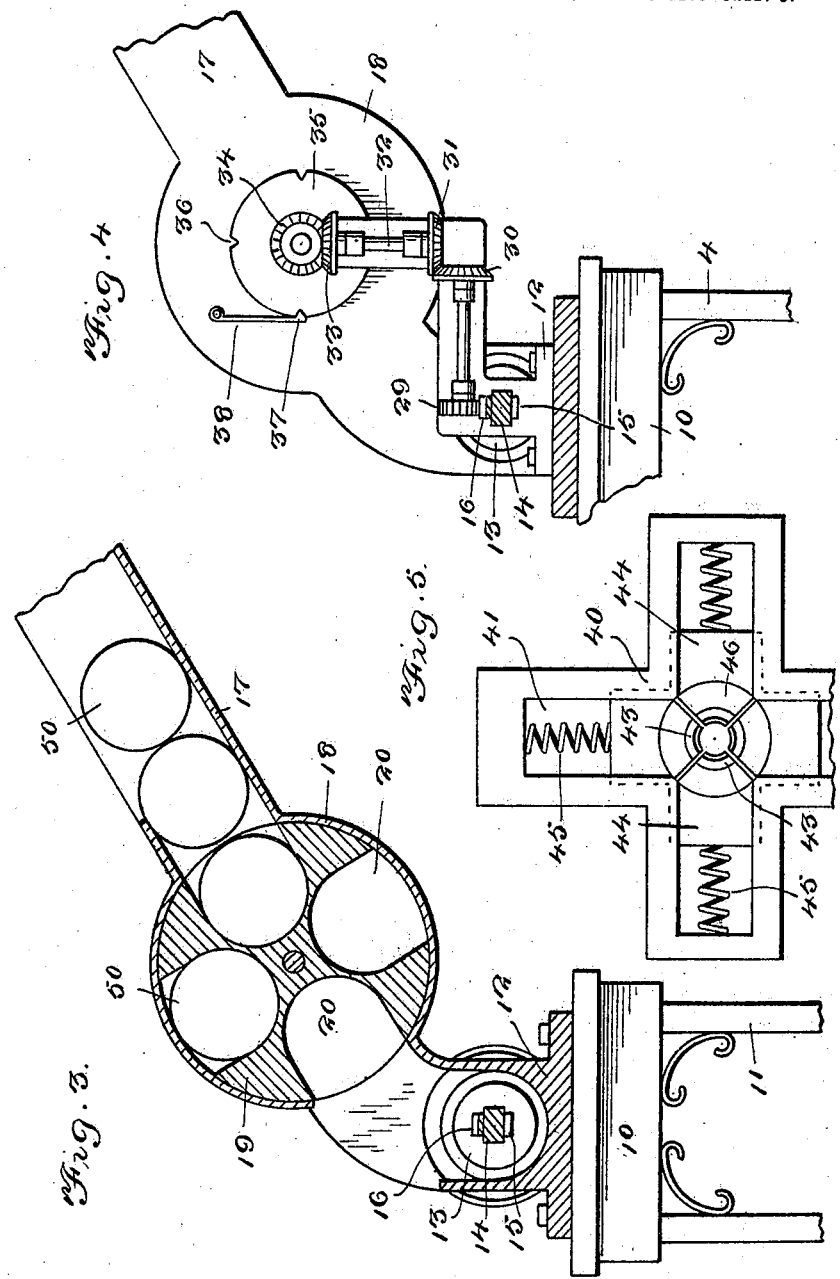
Carlo Merli
Giuseppe Bertolini
INVENTOR
BY Victor J. Evans
ATTORNEY
WITNESS:

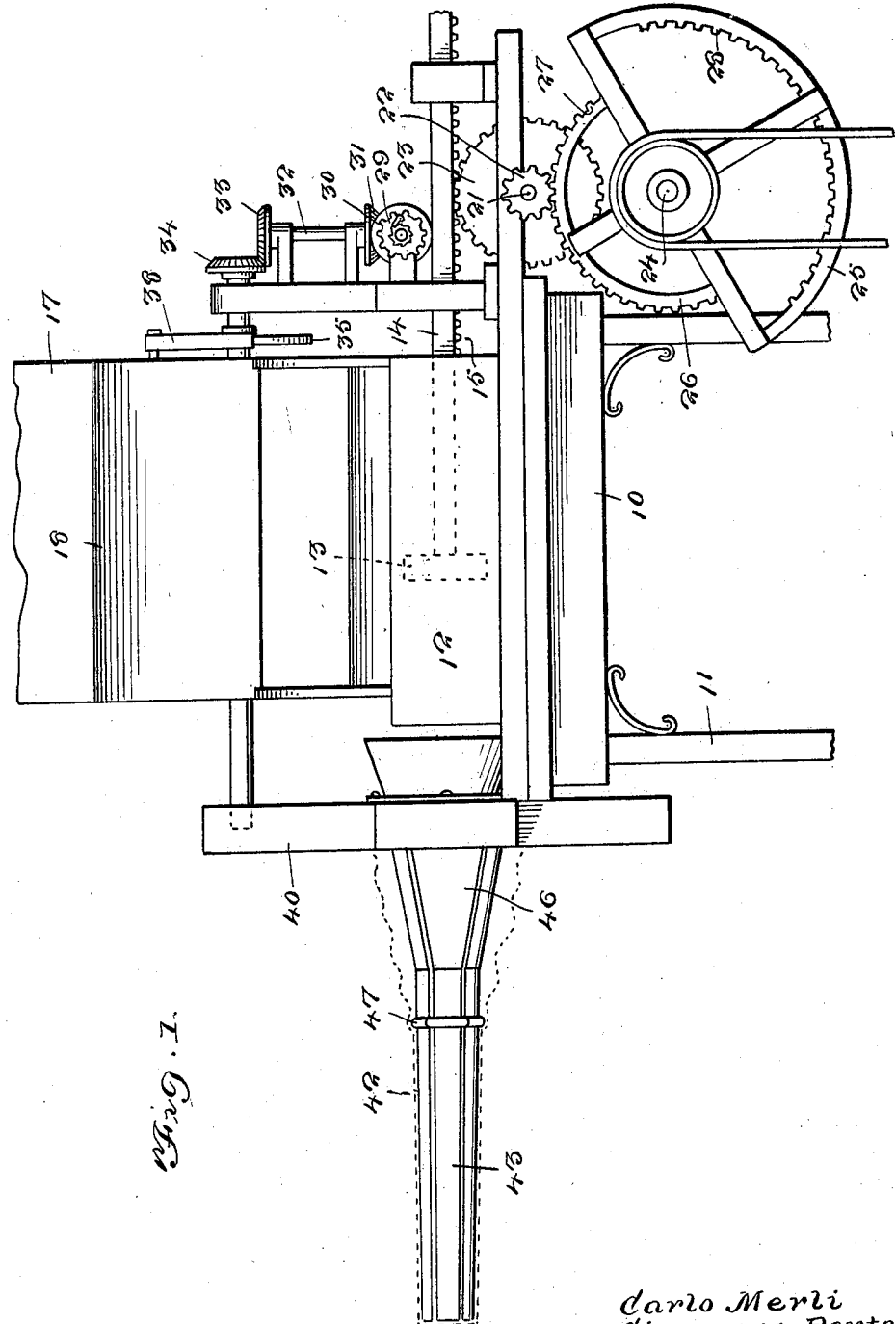

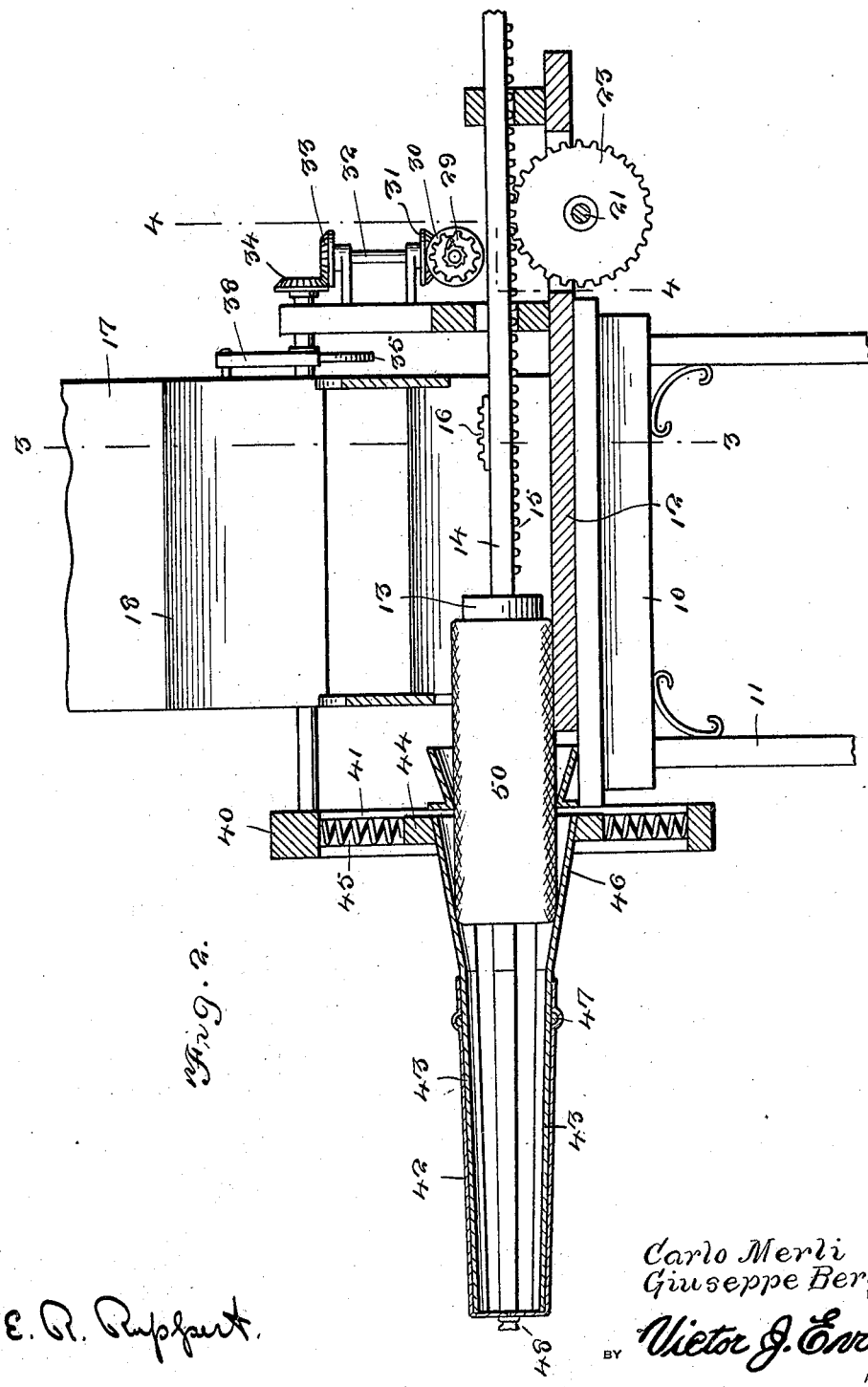

UNITED STATES PATENT OFFICE.

CARLO MERLI AND GIUSEPPE BERTOLINI, OF NEW YORK, N. Y.; SAID BERTOLINI ASSIGNOR OF HIS ENTIRE RIGHT TO VICTOR KLEINBERG, SALVATORE MANGIAPANE, AND FRANK FUMO, ALL OF NEW YORK, N. Y.

MACHINE FOR STUFFING MEAT AND LIKE PROVISIONS.

1,395,967.     Specification of Letters Patent.     Patented Nov. 1, 1921.

Application filed September 4, 1920. Serial No. 408,207.

*To all whom it may concern:*

Be it known that we, CARLO MERLI and GIUSEPPE BERTOLINI, subjects of the King of Italy, residing at New York, in the county of New York and State of New York, have invented new and useful Improvements in a Machine for Stuffing Meats and like Provisions, of which the following is a specification.

This invention comprehends the provision of a machine by means of which meat can be quickly and easily stuffed or packed in a skin or wrapping.

The nature and advantages of the invention will be better understood when the following detail description is read in connection with the accompanying drawings, the invention residing in the construction, combination and arrangement of parts as claimed.

In the drawings forming part of this application, like numerals of reference indicate similar parts in the several views and wherein:

Figure 1 is a side elevation of the machine for stuffing or packing the meat.

Fig. 2 is a vertical sectional view therethrough.

Fig. 3 is a sectional view taken on the line 3—3 of Fig. 2.

Fig. 4 is a sectional view taken on the line 4—4 of Fig. 2.

Fig. 5 is a fragmentary end elevation.

Referring to the drawings in detail, and particularly Figs. 1 to 5 inclusive, we have illustrated the machine for stuffing or packing the meat in its skin or wrapper, and wherein 10 indicates the base of the machine supported by legs 11. Mounted upon the base 10 is a casting 12 designed to accommodate a sliding plunger 13, the latter being equipped with a plunger rod 14 having rack teeth 15 along its lower edge throughout its entire length, and rack teeth 16 on its upper edge at an appropriate point in its length for a purpose to be hereinafter described. Associated with the casting 12, and preferably forming an integral part thereof is a chute or hopper 17 formed to provide an enlarged cylindrical portion 18 in which is rotatably mounted a feed roller 19 having a plurality of grooves 20.

Fixed upon a shaft 21 is a relatively small gear 22, and carried by the same shaft is a relatively large gear 23 which meshes with the rack teeth 15 of the plunger rod 14. A power driven shaft 24 supports a wheel including a relatively large segment 25 and a relatively small segment 26, the latter having teeth 27 on the outer surface thereof, while the segment 25 is provided with teeth 28 along the inner edge or surface thereof. As this wheel is rotated, the segments 25 and 26 respectively alternately mesh with the pinion 22, thus rotating the shaft 21 in reverse directions to impart reciprocatory motion to the plunger 13. A gear wheel 29 is rotatably mounted in the path of movement of the teeth 16 carried by the rack bar 14 and is rotated intermittently by the teeth 16 during the reciprocatory movement of the bar 14. The shaft upon which the gear 29 is mounted is equipped with a bevel gear 30 which meshes with a similar gear 31 secured to one end of the shaft 32, the opposite end of this shaft supporting a bevel gear 33 which meshes with a similar gear 34 carried by the axis of the feed roller 19, so that the latter is intermittently rotated by the rack bar 14. The axis of the feed roller 19 is equipped with a disk or the like 35 provided with notches 36 in the periphery thereof and which notches are singly received in the offset extremity 37 of a resilient element 38 which allows the roller to move step by step.

Arranged in advance of the casting 12 is a casting 40 having a configuration similar to a cross, each branch of which is grooved to provide a guideway 41 for one section of a sleeve-like member which constitutes a support for the skin or wrapper 42 in which the meat is to be stuffed or packed. This sleeve-like member is made up of four sections and is of resilient nature, each section being indicated at 43 and including a head 44 which is slidably fitted in one of the guideways 41. Arranged in each guideway is a coil spring 45 which bears against the head 44 of the adjacent sleeve section, and through the instrumentality of these springs 45 all of the sections are normally maintained closely related. The inner end of the sleeve-like member adjacent the heads 44 is flared, as at 46 to provide a proper entrance for both the meat and the plunger 13. As shown in Fig. 2 of the drawings, the skin or wrapper 42 for the meat is slipped from the sleeve-like member and held in position thereon by means of beads 47 formed on the respective sections of the sleeve-like member.

In practice, a skin or wrapper of cylindrical formation is slipped upon the sleeve-like member as shown in Fig. 2, and when the proper length of skin has been arranged upon the sleeve it is cut at the outer end of the sleeve, this end of the skin or wrapper is then tied, as at 48. The machine being in operation, the meat or like provisions indicated at 50 are arranged in the hopper 17 and received by the grooves 20 of the feed roller 19, and this roller is intermittently rotated in the manner above described and singly deposits the meat in the casting 12 in advance of the plunger 13. When the plunger 13 has moved forwardly, it forces the meat through the sleeve-like member into the skin or wrapper 42 which is sufficiently elastic to permit of the expanding of the sleeve, or in other words the relative movement of the respective sections thereof. In this manner, the meat is properly stuffed or packed into the skin or wrapper 42, and when the plunger 13 has been retracted or moved out of the sleeve-like member, the skin 42 together with its contents is removed from the sleeve sections 43. The open end of the wrapper or skin 42 is then tied in the same manner, as indicated at 48. The provision is then arranged on the machine, illustrated in Figs. 6 to 13 inclusive, to be roped or tied in the usual well-known manner.

While it is believed that from the foregoing description, the nature and advantages of the invention will be readily apparent, we desire to have it understood that we do not limit ourselves to what is herein shown and described and that such changes may be resorted to when desired as fall within the scope of what is claimed.

What we claim is:—

1. In a meat stuffing machine, a base, a casting mounted upon the base and designed to receive the meat, means for feeding the meat to said casting, a plunger arranged to reciprocate through the casting, means for reciprocating said plunger, and a skin holder arranged in advance of the casting and in which the meat is forced by means of said plunger.

2. In a meat stuffing machine, a base, a casting mounted upon the base and designed to receive the meat, a plunger arranged to reciprocate within said casting, a grooved feed roller for conveying the meat to the casting, means for intermittently rotating said roller, means for actuating said plunger, and a skin holder arranged in advance of said casting and in which the meat is forced by said plunger.

3. In a meat stuffing machine, a base, a casting mounted upon the base and designed to accommodate the meat, means for feeding the meat to the casting, a plunger arranged to reciprocate within the casting, means for reciprocating said plunger, a skin holder arranged in advance of said casting, said holder comprising a plurality of relatively movable resilient sections unitedly defining a sleeve-like member into which the meat is forced by the said plunger.

In testimony whereof we affix our signatures.

CARLO MERLI.
GIUSEPPE BERTOLINI.